United States Patent
Popp et al.

(10) Patent No.: US 6,630,158 B2
(45) Date of Patent: Oct. 7, 2003

(54) DIETARY SUPPLEMENT COMPOSITION AND METHOD FOR IMPROVING AND MAINTAINING HEALTHY SKIN

(75) Inventors: Karl F. Popp, Schodack Landing, NY (US); Samuel J. Alioto, Saint Louis, MO (US)

(73) Assignee: Stiefel Laboratories, Inc., Oak Hill, NY (US)

( * ) Notice: Subject to any disclaimer, the term of this patent is extended or adjusted under 35 U.S.C. 154(b) by 113 days.

(21) Appl. No.: 10/003,926

(22) Filed: Oct. 30, 2001

(65) Prior Publication Data

US 2002/0132800 A1 Sep. 19, 2002

Related U.S. Application Data

(60) Provisional application No. 60/244,635, filed on Oct. 31, 2000.

(51) Int. Cl.[7] .............................................. A61K 47/00
(52) U.S. Cl. ...................... 424/439; 424/400; 424/464; 424/600; 424/617; 424/630; 424/639; 424/641; 424/474
(58) Field of Search ................................ 424/400, 439, 424/464, 600, 617, 630, 639, 641, 474

(56) References Cited

U.S. PATENT DOCUMENTS

| | | |
|---|---|---|
| 5,804,168 A | 9/1998 | Murad |
| 6,048,846 A | 4/2000 | Cochran |
| 6,086,910 A | 7/2000 | Howard et al. |
| 6,099,854 A | 8/2000 | Howard et al. |
| 6,103,756 A | 8/2000 | Gorsek |
| 6,121,243 A | 9/2000 | Lanzendorfer et al. |
| 2002/0155163 A1 * | 10/2002 | Benjamin et al. ........... 424/600 |

OTHER PUBLICATIONS

Ribaya–Mercadeo, J.D., et al., Skin Lycopene is Destroyed Preferentially Over Beta–Carotene During Ultraviolet Irradiation in Humans, 125(7) J. Nutr. 1854–9 (Jul. 1995).

L. Santamaria, et al., Chemoprevention of Indirect and Direct Chemical Carcinogenesis by Carotenoids as Oxygen Radical Quenchers, 534 Ann. N.Y. Acad. Sci. 584–96 (1988).

Lee, J., Jiang, et al., Carotenoid Supplementation Reduces Erythema in Human Skin After Simulated Solar Radiation Exposure PSEBM 223: 170–174 (2000).

Stahl, Wilhelm, et al., Carotenoids and carotenoids plus vitamin E Protect against ultraviolet light–induced erythema in humans, Am. J. Clin. Nutr. 71: 795–798 (2000).

Coombs, Jr., G.F., et al., Reduction of Cancer Risk with an Oral Supplement of Selenium 10 (2–3) Biomed. Enriron. Sci. 227–34 (Sep. 1997).

Proud, V.K., et al., Fatty acid alterations and carboxylase deficiencies in the skin of biotin–deficient rats, Am. J. Clin. Nutr. 51: 853–858 (1990).

* cited by examiner

Primary Examiner—Thurman K. Page
Assistant Examiner—Charesse Evans
(74) Attorney, Agent, or Firm—Lott & Friedland, P.A.

(57) ABSTRACT

A dietary supplement composition for promoting healthy skin comprised of lycopene and other carotenoids, selenium, chromium and biotin.

11 Claims, No Drawings

DIETARY SUPPLEMENT COMPOSITION AND METHOD FOR IMPROVING AND MAINTAINING HEALTHY SKIN

CLAIM OF PRIORITY

This application is related to provisional application Serial No. 60/244,635 filed on Oct. 31, 2000 based upon which priority is claimed pursuant to 35 U.S.C. §119(e).

TECHNICAL FIELD

This invention relates to dietary supplement compositions useful for improving or maintaining the skin.

BACKGROUND OF THE INVENTION

This invention relates to new and improved dietary supplement compositions for and methods of promoting healthy skin in humans and other animals. More particularly it relates to a composition comprised of lycopene, biotin, selenium, chromium and carotenoids and the administration of such a composition to human or animal subjects.

More particularly, the invention relates to various compositions of dietary supplements designed to promote optimal levels of such nutrients in the body and methods of using such compositions.

The skin is the body's outer covering and the body's largest organ. Skin protects the body against heat, light, injury, and infection. It regulates body temperature and stores water, fat, and vitamin D. The skin is comprised of two layers, the outer epidermis and the inner dermis. The epidermis consists of primarily flat, scale-like cells called squamous cells. Beneath the squamous cells is a round layer of cells called basal cells. As basal cells mature they become squamous cells. The deepest part of the epidermis also contains melanocytes that produce the skin pigment melanin. The dermis contains blood and lymph vessels, hair follicles, and sweat and sebum producing glands that reach the surface through pores. Sweat helps regulate body temperature, and sebum, an oily substance, helps keep the skin from drying out.

The epidermis is continuously renewed by cell division of the keratinocytes in the basal cell layer. The basal layer is composed of columnar shaped cells that are anchored to a basement membrane separating the epidermis and dermis. Interspersed amongst the basal cells are the melanocytes responsible for melanin pigment production. Basal cells divide and form an intermediate prickle cell layer. As these cells ascend toward the surface they undergo keratinization in which the cells are filled with fibrous protein keratin. The skin surface is called the stratum corneum and is comprised of fully flattened, keratinized cells devoid of nuclei and other cellular organelles. Adjacent cells overlap at their margins and this locking together of cells, together with intercellular lipid, forms a very effective barrier. The stratum corneum is of variable thickness depending on the region of the body. It is thickest over the hands and feet. Daily wear and tear abrade away the stratum corneum. The renewal cycle runs approximately 52–75 days.

The prickle cell layer acquires its name from the spiky appearance produced by desmosomes (intercellular bridges) that connect adjacent cells. Scattered throughout the prickle cell layer are numbers of dendritic cells called Langerhans cells. Like macrophages, Langerhans cells originate in the bone marrow and have an antigen-presenting capacity. Between the prickle cell layer and the stratum corneum is the granular layer that is composed of rather flattened cells. Cells in the granular layer also contain organelles known as lamellar granules. Lamellar granules contain lipids and enzymes that are discharged into the intercellular spaces between the granular layer and stratum corneum, serving to join the two layers.

The rate of cell production in the germinative compartment of the epidermis must be balanced by the rate of cell loss at the surface of the stratum corneum. The control mechanism of epidermopoiesis consists of a balance of stimulatory and inhibitory signals. Wound healing provides a model to examine the changes in growth control that occur in establishing a new epidermis. Wounding of the skin is followed by a wave of epidermal mitotic activity, which represents the effects of diffusible factors spreading from the wound into the surrounding tissue. These factors include cytokines and growth factors that are produced by keratinocytes in vitro and can be found in physiological amounts in normal human skin.

Damage to the skin from normal environmental exposures has been well documented. U.S. Pat. No. 5,804,168 discloses that the skin is considered a highly stressed organ. It is subject to chemical attack and also to constant exposure to ultraviolet radiation. Prolonged exposure to ultraviolet light is linked to skin damage characterized by sunburn, aging and cancer. The production of free radicals from oxygen in the presence of ultraviolet light is linked to degradation of collagen and other structural components of the skin in addition to DNA mutation and structural changes which impair the skins ability to heal itself or worse causes normal cells to turn cancerous.

The scientific and patent literature contains numerous examples of attempts to prevent or repair skin damage using nutritional supplements. Such efforts have included topical and oral use of vitamins, minerals, essential fatty acids and various plant extracts in an effort to assist the skin in responding to environmental stresses. Many of these nutritional supplements contain active ingredients that are not part of the United States Recommended Daily Allowance (RDA) of essential nutrients.

Table 1 sets forth the United States Recommended Daily Allowance (US RDA) as established by the Department of Health and Human Services and the Department of Agriculture. The US RDA is a list of vitamins and minerals for which minimum or maximum daily nutritional requirements have been established.

TABLE 1

United States Recommended Daily Allowance (US RDA)
List of nutritionally essential macronutrients and micronutrients
(13 vitamins and 14 minerals), as described in the Code of Federal
Regulation (21 CFR 101.9, 2000).

| Essential Nutrient | 100% (D.V.) |
|---|---|
| Total Fat | 65 g |
| Saturated Fat | 20 g |
| Cholesterol | 300 mg |
| Sodium | 2,400 mg |
| Potassium | 3,500 mg |
| Total Carbohydrate | 300 g |
| Dietary Fiber | 25 g |
| Protein | 50 g |
| Vitamin A | 5,000 IU* |
| (Beta Carotene) | (as % of vitamin A) |
| Vitamin C | 60 mg |
| Calcium | 1,000 mg |
| Iron | 18 mg |
| Vitamin D | 400 IU |

TABLE 1-continued

United States Recommended Daily Allowance (US RDA)
List of nutritionally essential macronutrients and micronutrients
(13 vitamins and 14 minerals), as described in the Code of Federal
Regulation (21 CFR 101.9, 2000).

| Essential Nutrient | 100% (D.V.) |
|---|---|
| Vitamin E | 30 IU |
| Vitamin K | 80 mcg |
| Thiamine (Vitamin B1) | 1.5 mg |
| Riboflavin (Vitamin B2) | 1.7 mg |
| Niacin | 20 mg |
| Vitamin B6 | 2.0 mg |
| Folate | 400 mcg |
| Vitamin B12 | 6.0 mcg |
| Biotin | 300 mcg |
| Pantothenic Acid | 10 mg |
| Phosphorus | 1,000 mg |
| Iodine | 150 mcg |
| Magnesium | 400 mg |
| Zinc | 15 mg |
| Selenium | 70 mcg |
| Copper | 2.0 mg |
| Manganese | 2.0 mg |
| Chromium | 120 mcg |
| Molybdenum | 75 mcg |
| Chloride | 3,400 mg |

U.S. Pat. No. 5,804,168 discloses a nutritional composition to protect skin from the damaging effects of sunlight comprising an antioxidant, such as vitamin A, an anti-inflammatory component, such as vitamin E or zinc, and an immunity-boosting compound such as echinacea or golden seal.

U.S. Pat. Nos. 6,099,854 and 6,086,910 disclose and claim a dietary supplement flavonoid and polyphenol composition optionally including one or more of the following: Lutein, 2 to 50, mg, Beta carotene, 2 to 20 mg, Vitamin A, 400 to 600, Vitamin C, 75 to 250 mg, Folic Acid, 0.1 to 1.0 mg, Selenium, 80 to 120 mug, Copper, 2 to 4 mg, Zinc, 10 to 20 mg, Coenzyme Q10, 10 to 200, mg, Aspirin, 10 to 150

U.S. Pat. No. 6,121,243 discloses the topical dermatological use of alpha-glucosyl rutin in combination with one or more cinnamic acids and optionally carotenoids (alpha-carotene, beta-carotene and lycopene), alpha-hydroxy acids, folic acid, vitamin C and derivatives, tocopherols, vitamin A and zinc and selenium.

U.S. Pat. No. 6,103,756 discloses oral compounds and methods for treating diseases of the eye comprising: vitamin A, vitamin E, vitamin C, magnesium, selenium, bilberry extract, L-taurine, lutein extract, lycopene extract, alpha lipoic acid, quercetin, rutin and citrus bioflavonoids. The formulation optionally contains at least one of the following: vitamin D3, thiamine, riboflavin, niacin, vitamin B6, folic acid, vitamin B12, biotin, pantothenic acid, calcium, iodine, zinc, copper, manganese, chromium, molybdenum, n-acetyl-cysteine, plant enzymes, biopene, malic acid, L-glycine, L-glutathionine or boron.

U.S. Pat. No. 6,048,846 discloses a dietary supplement comprising dehydroepiandrosterone (DHEA) or melatonin; an amino acid selected from the group consisting of taurine, arginine, tyrosine and glutamine; coenzyme Q10; and at least one mineral selected from the group consisting of calcium, magnesium, potassium, zinc and copper. Also disclosed is optionally including antioxidants selected from one or more of the group consisting of: multi-carotenes, alpha-, beta- and gamma carotenes, lycopene, lutein zeanthins, Vitamin E, Vitamin C and Niacin. Further disclosed is the inclusion of one or more of the following: calcium, magnesium, Vitamin D3, iodine, iron, potassium gluconate, zinc, Vitamin K, copper, chromium, lecithin, lecithin choline, selenium and piperine.

SUMMARY OF THE INVENTION

The invention is a dietary supplement composition for promoting and maintaining healthy skin containing essential ingredients lycopene carotenoids, biotin, chromium and selenium. These are essential ingredients that have been shown to have a protective effect on the health of the skin.

DESCRIPTION OF THE PREFERRED EMBODIMENTS

While the patent and scientific literature is replete with nutritional supplement and vitamin formulations, there is no disclosure of the present invention for the promotion and maintenance of healthy skin. Even though some of the aforementioned ingredients are available in common multi-vitamin supplements, they are not provided in the combinations or in the quantities believed to be necessary to promote and maintain healthy skin as disclosed herein. Furthermore, there has been, apparently, no suggestion as to the use of these ingredients to promote healthy skin.

The present invention uses nutritional antioxidants to reduce free radical damage to the skin. A number of vitamins, minerals, and other dietary supplements are believed to play a role in maintaining healthy skin. The present invention comprises a combination of lycopene, selenium, chromium, biotin and other carotenoids for the purpose of enhancing or promoting healthy skin.

Lycopene is the red-pigmented carotenoid that gives tomatoes their color. This unique molecule comprises a long chain of conjugated double bonds that give lycopene its ability to neutralize free radicals. In particular, lycopene is a powerful neutralizer of superoxide ($O_2$). It is believed that lycopene has significant antioxidant activity in the skin. Ribaya-Mercado, J. D., et al. *Skin Lycopene is Destroyed Preferentially Over Beta-Carotene During Ultraviolet Irradiation in Humans,* 125(7) J. Nutr. 1854–9 (July 1995).

Carotenoids as used herein include, but are not limited to alpha carotene, beta-carotene, gamma carotene and mixtures thereof in which lycopene is not a major component. Following intake, beta-carotene is converted to all-trans retinol in the intestine and stored in the liver. Circulating retinol is taken up by the skin cells via passive diffusion. Dietary intake has been shown to be inversely related to the risk of developing psoriasis. Low serum beta-carotene has also been identified in melanoma patients. It is believed that the carotenoids, particularly beta-carotene, also play a significant role in preventing skin carcinogenesis. L. Santamaria, et al. *Chemoprevention of Indirect and Direct Chemical Carcinogenesis by Carotenoids as Oxygen Radical Quenchers,* 534 Ann. N.Y. Acad. Sci. 584–96 (1988). Lee, J., Jiang, et al., *Carotenoid Supplementation Reduces Erythema in Human Skin After Simulated Solar Radiation Exposure* PSEBM 223: 170–174 (2000). Wilhelm Stahl, et al., *Carotenoids and carotenoids plus vitamin E protect against ultraviolet light-induced erythema in humans,* Am J Clin Nutr 71: 795–798 (2000).

Selenium is present in both the dermis and epidermis and is a considered to be a significant antioxidant that protects cell membranes and prevents free radical generation. Studies have shown that administration of selenium may reduce the risk of various cancers including skin, breast, colon, lung and prostate cancer. G. F. Coombs, Jr., et al., *Reduction of Cancer Risk with an Oral Supplement of Selenium,* 10(2–3)

Biomed. Environ. Sci. 227–34 (September 1997). Selenium also plays a significant role in maintaining tissue elasticity and prevention of aging and hardening caused by oxidation. Low selenium levels have been identified in psoriasis and eczema patients and may lead to changes in color of the nail bed. This mineral is also an essential component of glutathione peroxidase, an inhibitory enzyme of 5-lipoxygenase, the pathway that promotes formation of inflammatory leukotrienes. Selenium is helpful when given with vitamin E to acne patients having low red blood cell glutathione peroxidase levels. A loss of selenium from epidermal desquamation may increase the rate of cell turnover. Selenium has been shown to play a role in apoptosis (programmed cell death) and as such may reduce the risk of cancer. Suitable forms of selenium can include sodium selenate, sodium selenite, selenomethionine, and selenium yeast.

Biotin is a B complex growth factor that is known to aid in the utilization of protein, folic acid, pantothenic acid, and vitamin B-12, promotes healthy hair. Biotin deficiency has been hypothesized as a factor in skin disorders. V K Proud, et al., *Fatty Acid Alterations And Carboxylase Deficiencies In The Skin Of Biotin-Deficient Rats,* Am J Clin Nutr 51: 853–858 (1990). Supplementation is believed to improve severe seborrheic dermatitis and some forms of alopecia (hair loss).

Chromium as used in this application refers to the element chromium or any of its nutritionally acceptable salts. Chromium works with insulin in the metabolism of sugar and stabilizes blood sugar levels; cleans the arteries by reducing cholesterol & triglyceride levels; helps transport amino acids to where the body needs them; helps control the appetite; medical research has shown that persons with low levels of chromium in their bodies are more susceptible to having cancer and heart problems and becoming diabetic. In acne patients, skin glucose levels may be increased providing additional nutrient sources for opportunistic bacteria that cause acne flare-ups. Chromium has been demonstrated to improve glucose tolerance in acne patients. Additionally, patients with a chromium deficiency may experience peripheral or central neuropathy. Chromium may be produced from any chromium salt suitable for human consumption, such as, for instance, chromium chloride, which is preferred.

Other nutritional supplements can be added to the formulation, although they are not essential for its function. Any known dietary supplement may be added to the above listed essential components. Preferred optional components include those vitamins and minerals that are known to play a role in maintaining healthy skin. These optional components and their function are further described below.

Vitamin A is a critical regulator for the growth and development of skin. It plays an important role in epithelial proliferation and keratinization. Vitamin A also inhibits orinithine decarboxylase that is the rate limiting step in formation of polyamines. Polyamines are increased in psoriasis patients and lowering them has been associated with clinical improvement. Vitamin A has also been shown to enhance skin repair following ultraviolet damage and may be beneficial for acne and chronic eczema patients.

Vitamin C is required for collagen formation, healthy strong blood vessels and joint health. It plays a co-factor role in the hydroxylation of lipine and proline and specifically induces collagen synthesis on a molecular level. Vitamin C plays a role in infection resistance and in capillary formation in the skin. Deficiencies in the diet lead to disorders in the connective tissues and skin including rickets and an increase in size of acne lesions.

Vitamin E is a fat-soluble vitamin and an active free radical scavenger that plays a role in stabilizing cell membranes by inhibiting the oxidation of poly-unsaturated fatty acids. Vitamin E deficiency can result in impaired vitamin A absorption. When combined with selenium and provided as a supplement, vitamin E has been show to help acne patients with low red blood cell glutathione peroxidase levels, and is also beneficial in scleroderma, seborrheic dermatitis and in the prevention of melanoma.

Riboflavin (vitamin B2) is an essential B complex vitamin. Twenty seven percent of adolescent acne patients are deficient in riboflavin. Deficiencies of riboflavin are also linked to seborrheic dermatitis and other skin disorders resulting from defective collagen synthesis.

Vitamin B6 (pyroxidine) plays a vital role in the multiplication and replication of cells. Pyroxidine is involved in tryptophan metabolism and also in the metabolism of essential fatty acids. A deficiency of pyroxidine can result in seborrheic lesions. Pyroxidine is also beneficial in premenstrual acne flare-ups and may be beneficial in acne vulgaris and acne rosacea.

Folic acid co-enzymes participate in single carbon transfers including purine biosynthesis and conversions among 3 amino acids. Ultraviolet light has been shown to lower serum folate levels, implying in vivo photolysis of folic acid. Psoriasis patients are known to be deficient in folic acid. Supplementation with folic acid may benefit psoriasis and seborrheic dermatitis patients.

Copper is a component of tyrosinase, a metalloenzyme essential for melanin production. It is also a co-factor of other enzymes in wound healing and plays important roles in collagen formation, elastin production and hair maturation.

Manganese is present in high concentrations in melanocytes and may be involved in the auto-oxidation of melanin granules. Manganese is necessary for arginase activity in the epidermis. Manganese deficiency is associated with dermatitis and affects hair color and growth.

Nickel is a cofactor in nucleic acid metabolism and is part of the urease group of metalloenzymes. Psoriasis patients have been shown to have nickel deficiencies. Silicon is required by the body for the proper functioning of prolyhydrogenase, an important enzyme in the formation of collagen in connective tissues such as skin, ligaments and tendons. The highest concentrations of silicon are found in the skin and hair. The overall silicon content of the skin decreases with age.

Zinc is an essential trace element with significant antioxidant activity that is also linked to collagen production. Up to 20% of the body's stores of zinc are found in the skin, where zinc is 3–6 times more concentrated in the epidermis than the dermis. Zinc deficiency manifests itself clinically as dermatitis and alopecia and is also is associated with psoriasis. Low serum zinc levels slow wound healing and aggravates existing skin disorders. Zinc supplementation has been shown to speed postoperative wound healing and to be of benefit to acne patients.

As shown by table one, there is no U.S. RDA for lycopene or for carotenoids in general. The RDA for vitamin A allows expression of carotenoids as a percentage of the total vitamin A present. The U.S. RDA is very conservative in nature and does not make allowance for the rapid advances in modem nutrition. In particular, it does not recognize that there is increasing evidence of a relationship between antioxidants and aging and cancer.

While some of the aforementioned ingredients are available in common multivitamin/multimineral supplements, they are not provided in the combinations or in the quantities believed to be necessary to promote and maintain healthy skin as disclosed herein. Furthermore, there has been, apparently, no suggestion as to the use of these ingredients to promote healthy skin.

The present invention comprises a total daily dosage containing as essential ingredients: lycopene 0.5–500 mg, carotenoids, biotin 30 μg to 120 mg, chromium 2–2000 μg and selenium 5–50 μg. These are essential ingredients that have been shown to have a protective effect on the health of the skin.

In addition to the essential ingredients, the following optional compounds may be added alone or in combination: vitamin A, vitamin C (ascorbic acid), calcium, iron, vitamin D, vitamin E, vitamin K, thiamine (vitamin B1), riboflavin (vitamin B2), niacin, vitamin B6, folate, vitamin B12, biotin, pantothenic acid, phosphorus, iodine, magnesium, zinc, copper, manganese, molybdenum, chloride, Such components may be present in the following daily dosage ranges: vitamin A 50–20,000 IU, vitamin C 50–1000 mg, vitamin E 30–1200 IU, riboflavin 2.5–25 mg, vitamin $B_6$ 2.5–25 mg, folate 40–800 mcg, calcium 30–600 mg, zinc 5–100 mg, copper 0.2–10 mg, manganese 0.2–10 mg, silicon 0.2–100 mg, More preferred, one of more of the above optional compounds will be present within the following daily dosage ranges: vitamin A 75–750 mg, vitamin C 75–750 mg, vitamin E 30–600 IU, riboflavin 5–15 mg, vitamin $B_6$ 5–15 mg, folate 100–500 mcg, calcium 100–400 mg, zinc 25–75 mg, copper 1–5 mg, manganese 1–7.5 mg, silicon 1–50 mg.

A daily dosage of the most preferred embodiment contains the quantity of active ingredients set forth in Table 2.

TABLE 2

Composition of Daily Dosage for Preferred Embodiment

| | |
|---|---|
| Vitamin A (29% as Beta Carotene) | 3500 IU |
| Vitamin C | 120 mg |
| Vitamin E | 60 IU |
| Riboflavin | 8.5 mg |
| Vitamin $B_6$ | 10 mg |
| Folate | 400 mcg |
| Biotin | 600 mcg |
| Calcium | 270 mg |
| Zinc | 45 mg |
| Selenium | 50 mcg |
| Copper | 2 mg |
| Manganese | 5 mg |
| Chromium | 200 mcg |
| Lycopene | 5 mg |
| Silicon | 20 mg |

Delivery of therapeutic or sub-therapeutic quantities of the above ingredient compositions may be accomplished through administration of single or multiple units given at one time or multiple times throughout the day. It is important to note that these formulations are not meant as a replacement of those ingredients naturally produced in the body and/or consumed in the diet, but rather represent a supplement designed to increase normal levels of the above ingredients in the body.

Solid dosage forms for oral administration include capsules, tablets, pills, powders, and granules. Solid dosage forms of the present invention may be created using any pharmaceutically acceptable excipients such as: a) fillers or extenders such as starches, lactose, sucrose, glucose, mannitol, cellulose, maltodextrin and silicic acid; b) binders such as, for example, carboxymethylcellulose, alginates, gelatin, polyvinylpyrrolidone, sucrose, and acacia; c) humectants such as glycerol; d) disintegrating agents such as sodium starch glycolate, agar-agar, calcium carbonate, cornstarch, potato or tapioca starch, alginic acid, certain silicates, and sodium carbonate; e) wetting agents such as, for example, mineral oil, polyethylene glycol, cetyl alcohol and glycerol monostearate; and f) lubricants such as magnesium stearate, stearic acid, talc, calcium stearate, solid polyethylene glycols, sodium lauryl sulfate, and mixtures thereof.

The solid compositions described above may also be employed as fillers in soft and hard-filled gelatin capsules using such excipients as lactose or milk sugar as well as high molecular weight polyethylene glycols and the like.

The solid dosage forms of tablets, capsules, powders, and granules can be prepared with coatings and shells such as enteric coatings and other coatings well known in the pharmaceutical formulating art. They may optionally contain opacifying agents and can also be of a composition that they release the active ingredient(s) only, or preferentially, in a certain part of the intestinal tract, optionally, in a delayed manner. Examples of embedding compositions that can be used include polymeric substances and waxes.

Optionally, the solid dosage form can be coated to mask or improve the taste, improve appearance or to alter the release rate. The use of such coatings is well known in the art. Examples of coating materials include, but are not limited to, sugars, waxes, polymethacrylates and cellulose polymers such as hydroxypropyl methylcellulose (HPMC) and combinations thereof with each other.

The active compounds can also be in microencapsulated form, if appropriate, with one or more of the above-mentioned excipients.

Liquid dosage forms for oral administration include pharmaceutically acceptable emulsions, solutions, suspensions, syrups and elixirs. In addition to the active compounds, the liquid dosage forms may contain inert diluents commonly used in the art such as, for example, water or other solvents, solubilizing agents and emulsifiers such as orally tolerable alcohols, like ethyl alcohol, ethyl carbonate, ethyl acetate, benzyl alcohol, benzyl benzoate, propylene glycol, 1,3-butylene glycol, dimethyl formamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, and perfuming agents.

Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar, and tragacanth, and mixtures thereof.

Alternative embodiments of the present invention are readily apparent to one skilled in the art and include, but are not limited to, tablets, capsules, liquid, wafer, cookie, or liquid filled capsules.

The preferred embodiment may be manufactured by combining in a suitable blender an appropriate amount of: ascorbic acid, ascorbyl palmitate, sodium ascorbate, sodium benzoate, biotin, butylated hydroxytoluene, calcium carbonate, beta carotene, cellulose, chromium chloride, corn starch, povidone, cupric oxide, folic acid, gelatin, sodium starch glycolate, lycopene, maltodextrim, manganese sulfate, mineral oil, dibasic calcium phosphate, polyethylene glycol, povidone, pyridoxine hydrochloride, riboflavin, sodium selenate, silicon dioxide, sorbic acid, sucrose, titanium dioxide, dl-alpha tocopherol acetate, vitamin A acetate, and zinc oxide. Then add and disperse the magnesium stearate and stearic acid. Optionally, either the selenium and/or chromium may be incorporated into the tablet blend or incorporated into the film coat. Compress the blend into tablets using a suitable rotary tablet press.

The film coat is prepared by mixing in water the following: FD&C Color Lakes, hydroxypropyl methylcellulose, mineral oil, polysorbate 80, polyethylene glycol, and titanium dioxide. The coating solution is applied to the tablets using a suitable film coating system, such as an Accelocota or Vectrin spray coater. Optionally, carnuba wax may be applied to the coated tablets to affect a glossy appearance.

In an alternative preferred embodiment the chromium chloride and selenium may be incorporated into and applied during the film coating of the compressed tablets instead of incorporating these elements into the tablet matrix.

In formulating the present invention, some ingredients may be added as pre-blends, triturates or salts to facilitate handling. The specific quantities of excipients may vary to yield a tablet that exhibits robust characteristics necessary for commercial production.

The above preferred embodiment results in a formulation with excellent stability. Table 3 sets forth the results of stability testing under Accelerated Storage Conditions of 40+/−2 degrees Celsius and 75+/−5% relative humidity.

TABLE 3

Stability Testing Results
Container and Closure: 150 cc white HDPE bottle and white polypropylene cap with wax faced pulpboard liner.
Accelerated Storage Conditions: 40 +/− 2 deg C. and 75 +/− 5% RH
Result as % of claim at indicated weeks
(NR = Value Not Recorded)

| Test | Claim | 0 wk | 4 wk | 8 wk | 13 wk | 26 wk |
|---|---|---|---|---|---|---|
| Vitamin A | 2500 IU | 136 | 134 | 113 | 106 | 110 |
| Vitamin E | 60 IU | 126 | 115 | 110 | 125 | 121 |
| Vitamin $B_2$ | 8.5 mg | 132 | 123 | 125 | 123 | 123 |
| Vitamin $B_6$ | 10.0 mg | 116 | 109 | 110 | 137 | 114 |
| Biotin | 600 µg | 105 | 101 | 100 | 114 | 93.0 |
| Folic Acid | 400 µg | 169 | 132 | 125 | 120 | 117 |
| Beta Carotene | 1000 IU | 123 | 139 | 130 | 144 | 124 |
| Vitamin C | 120 mg | 108 | 106 | 103 | 114 | 104 |
| Lycopene | 5 mg | 131 | 144 | 170 | 156 | 150 |
| Calcium | 270 mg | NR | NR | NR | 120 | 118 |
| Copper | 2 mg | 115 | 111 | 111 | 114 | 109 |
| Manganese | 5 mg | 119 | 114 | 115 | 115 | 113 |
| Zinc | 45 mg | 121 | 109 | 117 | 108 | 112 |
| Chromium | 200 µg | 139 | 128 | 120 | 133 | 121 |
| Selenium | 50 µg | 103 | 136 | 123 | 129 | 126 |
| Silicon | 20 mg | 108 | NR | 109 | 122 | 107 |
| Dissolution-Zinc | | 117 | 102 | 104 | 107 | NR |
| Dissolution-Calcium | | NR | NR | NR | 119 | 115 |
| Dissolution-Riboflavin | | 133 | 120 | 109 | 119 | 125 |

Accordingly, it is readily apparent that the present formulation is stable and does not readily degrade once produced. Such characteristics are important in developing a nutritional supplement that complies with the United States Food and Drug laws and regulations. Long-term stability is also important to provide for a reasonable shelf life to the consumer after warehousing and distribution.

A critical parameter to a product's viability in the market place is the ability of the product to meet its declared label claims. Government regulations define this as meeting not less than 90% of the labeled amount of an active ingredient.

Stability of vitamins may be adversely affected due to exposure to external environments such as light, oxygen and/or moisture. Dietary supplements are no exception.

Data generated show that the preferred embodiment meets the above stability criteria. However, stability may be further improved by appropriate product packaging. It is known that a variety of packaging materials can extend the shelf life of pharmaceutical products. Such packaging should have a product contact surface comprising plastics, films, foils, foams, papers, metals or glass. Additionally, the package configuration may be flexible or rigid or a combination of both. Packages may be molded, blow molded, extruded, injected molded, thermal-formed or by any other process that would form the shape of the package. Examples of appropriate packaging include glass, metal or plastic bottles having foil, coated paper, plastic, foam or film seals. Also appropriate is blister packaging using one or more of the following: plastic, film, coated paper, foam or foil. Packages may be labeled, printed, embossed, thermal-imaged or combination thereof as may be desired for regulatory or marketing purposes.

Suitable rigid or semi rigid packaging materials contemplated by this invention include, but are not limited to: acrylonitrile; acronilitrile-butadiene-styrene; aluminum; crystal; ethylene-vinyl alcohol; fluorinated ethylene propylene; fluoroplastic; glass; plastic; nitrile; nylon; polycarbonate; ethylene-vinyl alcohol; polypropylene; polyester; polyethylene; polyethylpentene; polypropylene/ethylene-vinyl alcohol; polystyrene; polyvinyl chloride; styrene-acrylonitrile. Metals suitable for packaging include, but are not limited to: aluminum; steel; stainless steel; or tin as well as coated and laminated versions thereof. Glass materials included in this invention include, but are not limited to silica derivatives such as: soda lime silica; borosilicate; high silica; aluminosilicate; barium; or flint.

One of skill in the art will recognize that a number of film, foil and foam structures used either alone, or in combination with rigid packaging materials will further improve stability. This include, but are not limited to, fluoroplastic films such as: chlorotrifluoroethylene; ethylene-chlorotrifluoroethylene; fluorinated ethylene propylene; perfluoroalkoxy; perfluoroalkoxy; polytetrafluoroethylene; polytetrafluoroethylene; polyvinylidene fluoride; tetrafluoroethylene; trifluoroethylene. Also suitable are cellulose based films such as but not limited to: cellophane; cellulose; cellulose acetate; cellulose acetate butyrate; cellulose propionate; cellulose triacetate; ethyl cellulose; methyl cellulose. General plastic films may also be utilized including but not limited to: acrylic; acrylonitrile-butadiene-styrene; acrolynitrite; methacrylate/mma; acrylonitrite; ethylene butene; ethylene-ethyl-acrylate; ethylene-methyl-acrylate; ethylene-vinyl acetate; nylon; polybutylene; polycarbonate; polyester; polyetherimide; polyethylene; polyethylene oxide; polyimide; polypropylene; polystyrene; polyurethane; polyvinyl acetate; polyvinyl chloride; polyvinylidene chloride; rubber-modified styrene; acrylonitrile; or polyethylene napthalate. Shrink-wrap films may also be used, including, but not limited to: ethylene-vinyl acetate, polyester; polyethylene; polyethylene/ethylene acrylic acid; polypropylene; polystyrene; polyvinyl chloride; or polyvinylidene chloride. Foams suitable for packaging include, but are not limited to: ethylene-vinyl acetate; polyester; polyether; polyethylene; polypropylene; polystyrene, polyurethane; vinyl; or polyvinyl chloride. Paper suitable for packaging includes but is not limited to: coated cellulose derivatives; metallized; waxed; glassine; kraft; latex, reinforced; or vegetable parchment.

Accordingly, it will be understood that the preferred embodiments of the invention have been disclosed by way of example and that other modifications and alterations may occur to those skilled in the art without departing from the scope and spirit of the appended claims.

What is claimed is:

1. A stable dietary supplement composition for maintaining and improving skin condition comprising as active ingredients:
    a) lycopene,
    b) carotenoids,
    c) biotin,
    d) chromium, and
    e) selenium;
    wherein said composition is a tablet with a coating and said coating contains at least one of the following: selenium, chromium.

2. A stable dietary supplement composition for maintaining and improving skin condition comprising as active ingredients:
    a) lycopene,
    b) carotenoids,
    c) biotin,
    d) chromium, and
    e) selenium;
    said composition further comprising an effective amount of one or more of the following active ingredients:
    d) vitamin A,
    e) vitamin C,
    f) calcium,
    g) iron,
    h) vitamin D,
    i) vitamin E,
    j) vitamin K,
    k) thiamine,
    l) riboflavin,
    m) niacin,
    n) vitamin B6,
    o) folate,
    p) vitamin B12,
    q) pantothenic acid,
    r) phosphorus,
    s) iodine,
    t) magnesium,
    u) zinc,
    v) copper,
    w) manganese,
    x) molybdenum,
    y) chloride, and
    z) nickel.

3. The dietary supplement composition of claim 2 wherein the composition comprises a tablet, powder, capsule, wafer, liquid or liquid filled capsule.

4. The dietary supplement composition of claim 2 wherein the composition is a tablet.

5. The dietary supplement composition of claim 4 where in all of the active ingredients are incorporated into the tablet core.

6. The dietary supplement composition of claim 4 wherein the tablet is coated.

7. The dietary supplement composition of claim 6 wherein the tablet coating contains at least one of the following: selenium, chromium.

8. A stable dietary supplement composition for maintaining and improving skin condition comprising as active ingredients:
    a) 0.5 to 500 mg lycopene,
    b) 0.05 to 1.5 mg carotenoids,
    c) 30 mcg to 120 mg biotin,
    d) 2 to 2000 mcg chromium, and
    e) 5 to 50 mcg selenium;
    wherein said composition is a tablet with a coating and said coating contains at least one of the following: selenium, chromium.

9. A stable dietary supplement composition for maintaining and improving skin condition comprising as active ingredients:
    a) 0.5 to 500 mg lycopene,
    b) 0.05 to 1.5 mg carotenoids,
    c) 30 mcg to 120 mg biotin,
    d) 2 to 2000 mcg chromium, and
    e) 5 to 50 mcg selenium;
    said composition further comprising an effective amount of one or more of the following active ingredients:
    f) 50 to 20,000 IU vitamin A,
    g) 50 to 1000 mg vitamin C,
    h) 30 to 1200 IU vitamin E,
    i) 2.5 to 25 mg riboflavin,
    j) 2.5 to 25 mg vitamin B6,
    k) 40 to 800 mcg folate,
    l) 30 to 600 mg calcium,
    m) 5 to 100 mg zinc,
    n) 0.2 to 10 mg copper,
    o) 0.2 to 10 mg manganese, and
    p) 0.2 to 100 mg silicon;
    wherein said composition is a tablet with a coating and said coating contains at least one of the following: selenium, chromium.

10. A stable dietary supplement composition for maintaining and improving skin condition comprising as active ingredients:
    a) 1 to 200 mg lycopene,
    b) 0.1 to 1.0 mg carotenoids,
    c) 30 mcg to 120 mg biotin,
    d) 2 to 2000 mcg chromium, and
    e) 5 to 50 mcg selenium;
    wherein said composition is a tablet with a coating and said coating contains at least one of the following: selenium, chromium.

11. A stable dietary supplement composition for maintaining and improving skin condition comprising as active ingredients:
    a) 1 to 200 mg lycopene,
    b) 0.1 to 1.0 mg carotenoids,
    c) 30 mcg to 120 mg biotin,
    d) 2 to 2000 mcg chromium, and
    e) 5 to 50 mcg selenium;
    said composition further comprising an effective amount of one or more of the following active ingredients:
    f) 75 to 750 IU vitamin A,
    g) 75 to 750 mg vitamin C,
    h) 30 to 600 IU vitamin E,
    i) 5 to 15 mg riboflavin, j) 5 to 15 mg vitamin B6,
k) 100 to 500 mcg folate,
l) 100 to 400 mg calcium,
m) 25 to 75 mg zinc,
n) 1 to 5 mg copper,
o) 1 to 7.5 mg manganese, and
p) 1 to 50 mg silicon;

wherein said composition is a tablet with a coating and said coating contains at least one of the following: selenium, chromium.

* * * * *